United States Patent

Halmos

(10) Patent No.: US 9,057,605 B2
(45) Date of Patent: Jun. 16, 2015

(54) BISTATIC SYNTHETIC APERTURE LADAR SYSTEM

(71) Applicant: Raytheon Company, Waltham, MA (US)

(72) Inventor: Maurice J. Halmos, Encino, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/706,746

(22) Filed: Dec. 6, 2012

(65) Prior Publication Data

US 2014/0160458 A1 Jun. 12, 2014

(51) Int. Cl.
*G01C 3/08* (2006.01)
*G01C 3/02* (2006.01)
*G01S 17/00* (2006.01)
*G01S 17/89* (2006.01)
*G01S 7/481* (2006.01)
*G01S 7/497* (2006.01)

(52) U.S. Cl.
CPC .............. *G01C 3/02* (2013.01); *G01S 17/003* (2013.01); *G01S 17/895* (2013.01); *G01S 7/4814* (2013.01); *G01S 7/4816* (2013.01); *G01S 7/497* (2013.01)

(58) Field of Classification Search
CPC .......................................................... G01C 3/02
USPC ........................................ 356/4.01; 342/25 F
See application file for complete search history.

(56) References Cited

U.S. PATENT DOCUMENTS

| 3,790,278 | A | 2/1974 | Buczek et al. |
| 4,743,110 | A | 5/1988 | Arnaud et al. |
| 4,959,800 | A | 9/1990 | Woolley |
| 4,968,968 | A | 11/1990 | Taylor |
| 5,289,252 | A | 2/1994 | Nourrcier |
| 5,398,130 | A | 3/1995 | Redman |
| 5,623,267 | A * | 4/1997 | Wurman ............... 342/26 D |
| 5,847,816 | A * | 12/1998 | Zediker et al. ............ 356/5.09 |
| 6,259,803 | B1 | 7/2001 | Wirtz et al. |
| 6,388,739 | B1 | 5/2002 | Rice |
| 6,545,785 | B1 | 4/2003 | Heflinger et al. |
| 6,559,932 | B1 * | 5/2003 | Halmos ................... 356/5.03 |

(Continued)

FOREIGN PATENT DOCUMENTS

| EP | 1 542 036 | 6/2005 |
| FR | 2 519 771 | 7/1983 |

(Continued)

OTHER PUBLICATIONS

Welsh et al, Bistatic imaging lidar technique for upper atmospheric studies, Jan. 1989, Applied Optics, vol. 28, issue 1, pp. 82-88.*

(Continued)

*Primary Examiner* — Isam Alsomiri
*Assistant Examiner* — Samantha K Abraham
(74) *Attorney, Agent, or Firm* — Daly, Crowley, Mofford & Durkee, LLP

(57) ABSTRACT

In one aspect, ladar system includes a ladar transmitter system and a ladar receiver system configured to receive data from the transmitter. The ladar transmitter system and the ladar receiver system are disposed in a configuration forming a bistatic synthetic aperture ladar system. In one example, the ladar transmitter system is configured to be disposed in a vehicle and the ladar receiver system is configured to be stationary.

15 Claims, 5 Drawing Sheets

(56) References Cited

U.S. PATENT DOCUMENTS

| | | | |
|---|---|---|---|
| 6,614,386 B1 | 9/2003 | Moore et al. | |
| 6,823,033 B2 | 11/2004 | Fahim | |
| 6,875,978 B2 | 4/2005 | Halmos | |
| 6,885,299 B2 | 4/2005 | Cooper et al. | |
| 7,239,777 B1 | 7/2007 | Christensen et al. | |
| 7,345,744 B2 | 3/2008 | Halmos et al. | |
| 7,414,706 B2 | 8/2008 | Nichols et al. | |
| 7,495,994 B2 | 2/2009 | Makris et al. | |
| 7,505,488 B2 * | 3/2009 | Halmos | 372/18 |
| 7,545,312 B2 | 6/2009 | Kiang et al. | |
| 7,684,957 B2 | 3/2010 | Ueno | |
| 7,805,082 B1 | 9/2010 | Whiteaway | |
| 7,961,332 B2 | 6/2011 | Kilpatrick et al. | |
| 7,986,397 B1 | 7/2011 | Tiemann et al. | |
| 8,487,808 B2 | 7/2013 | Boufounos et al. | |
| 8,767,187 B2 | 7/2014 | Coda et al. | |
| 8,947,644 B2 | 2/2015 | Halmos | |
| 8,947,647 B2 | 2/2015 | Halmos et al. | |
| 2003/0011780 A1 | 1/2003 | Dalhoff | |
| 2003/0030882 A1 | 2/2003 | Garrett et al. | |
| 2003/0075677 A1 | 4/2003 | Halmos | |
| 2005/0051713 A1 | 3/2005 | Halmos | |
| 2005/0099634 A1 * | 5/2005 | Dubois et al. | 356/502 |
| 2005/0237533 A1 | 10/2005 | Lal et al. | |
| 2006/0061753 A1 * | 3/2006 | Harris et al. | 356/4.05 |
| 2006/0079773 A1 | 4/2006 | Mourad et al. | |
| 2006/0202885 A1 | 9/2006 | Chen | |
| 2007/0166049 A1 | 7/2007 | Pearson et al. | |
| 2009/0237292 A1 | 9/2009 | Tigrek et al. | |
| 2009/0304393 A1 | 12/2009 | Kawanishi et al. | |
| 2010/0014567 A1 | 1/2010 | Yamamoto | |
| 2010/0102203 A1 | 4/2010 | Grund | |
| 2011/0299849 A1 | 12/2011 | Klotz et al. | |
| 2013/0104661 A1 | 5/2013 | Klotz et al. | |
| 2013/0148095 A1 | 6/2013 | Coda et al. | |
| 2013/0148103 A1 | 6/2013 | Halmos et al. | |
| 2013/0188167 A1 | 7/2013 | Halmos | |

FOREIGN PATENT DOCUMENTS

| | | |
|---|---|---|
| FR | 2519771 | 7/1983 |
| JP | 2000/065923 | 3/2000 |
| JP | 2004/309367 | 11/2004 |
| JP | 2006/329829 | 12/2006 |
| WO | WO 95/15503 | 6/1995 |
| WO | WO 2004/034530 | 4/2004 |
| WO | WO 2010 086044 | 8/2010 |
| WO | WO 2014/088689 A1 | 6/2014 |

OTHER PUBLICATIONS

Whiteman et al Raman Airborne Spectroscopic Lidar (RASL) Final Report, Sep. 2002, NASA pub.*
Extended European Search Report dated Jan. 28, 2013 for EP Application No. 12160148.8.
Kachelmyer "Laser vibration sensing", The Lincoln Laboratory Journal, vol. 8, No. 1, Jan. 1, 1995.
Kachelmyer "Inverse synthetic aperture radar (ISAR) image processing", Proceedings of SPIE, Jun. 1, 1992.
Sturm et al. "A technique for removing platform vibration noise from a pulsed ladar vibration sensor", Optics and Laser Technology, Elsevier Science Publishers, Amsterdam, NL; Oct. 1, 1995.
U.S. Appl. No. 13/353,854, filed Jan. 9, 2012, Halmos.
U.S. Appl. No. 13/324,162, filed Dec. 13, 2011, Halmos et al.
U.S. Appl. No. 13/324,155, filed Dec. 13, 2011, Coda et al.
Dierking et al., "Periodic, pseudonoise waveforms for multifunction coherent ladar," Applied Optics, vol. 49, No. 10, Apr. 1, 2010, p. 1908-1922.
Kachelmyer, "Range-Doppler Imaging: Waveforms and Receiver Design", Massachusetts Institute of Technology, Lincoln Laboratory, Lexington, Massachusetts, 1988, SPIE vol. 999 Laser Reader III, pp. 138-161.
Kachelmyer, "Spectrogram Processing of Laser Vibration Data," SPIE vol. 1936 Applied Laser Radar Technology (1993), p. 78-79.
Minden et al., "A Range-Resolved Doppler Imaging Sensor Based on Fiber Lasers," IEEE Journal of Selected Topics in Quantum Electronics, vol. 3, No. 4, Aug. 1997, p. 1080-1086.
Notification of Transmittal of The International Search Report & The Written Opinion of the ISA (Including The ISR & WO of the International Searching Authority), dated Jan. 20, 2014 for International Appl. No. PCT/US2013/062524, 15 pages.
Magee et al., "Bistatic Coherent Laser Radar Performance", Geoscience and Remote Sensing Symposium Proceedings, Jul. 1998, 3 pages.
Ostermeyer et al., "0.5 J Frequency Stabilized Diode Pumped Solid State Laser for a Next Generation Lidar System", Lasers and Electro-Optics, Conference in San Francisco, CA, May 16, 2004, 2 pages.
Response to Office Action from Foreign Associate dated Dec. 19, 2013, for EP Application No. 12159971.6-1811, filed on Mar. 16, 2012, 4 pgs.
European Search Report dated Apr. 17, 2013, for EP Appl. No. 12/182,615, 6 pgs.
Office Action dated Dec. 6, 2013 for U.S. Appl. No. 13/285,821, filed Oct. 31, 2011, 25 pgs.
The American Heritage Dictionary of the English Language, Fourth Edition. 2000. Houghton Mifflin Company. Updated in 2009. "The Free Dictionary: deterministic". http://thefreedictionary.com/deterministic.
Office Action dated Nov. 27, 2013 for U.S. Appl. No. 13/324,155, filed Dec. 13, 2011, 11 pages.
Response to Office Action from Foreign Associate dated Dec. 27, 2013, for EP Application No. 12161856.5-1811, filed on Mar. 28, 2012, 12 pgs.
Response filed by Foreign Associate dated Dec. 18, 2013 for EP Appl. No. 12160148.8, 13 pgs.
Notice of Allowance dated Oct. 20, 2014 corresponding to U.S. Appl. No. 13/353,854; 9 Pages.
Notice of Allowance dated Oct. 22, 2014 corresponding to U.S. Appl. No. 13/324,162; 10 Pages.
Office Action from the European Patent Office dated Dec. 15, 2014 corresponding to Appl. No. 12182615.0; 5 Pages.
Response to Office Action dated Aug. 25, 2014 corresponding to U.S. Appl. No. 13/285,821; Response Filed on Jan. 13, 2015; 12 Pages.
Office Action dated Aug. 25, 2014 corresponding to U.S. Appl. No. 13/285,821; 14 Pages.
Office Action dated Nov. 26, 2013 for U.S. Appl. No. 13/324,162, filed Dec. 13, 2011 13 pages.
Extended European Search Report dated Feb. 22, 2013; for European Patent Application No. 12159971.
European Search Report for Application No. 12160148.9-220 dated Feb. 2, 2013, 8 pages.
U.S. Appl. No. 13/324,162, filed Jan. 13, 2011, entitled: Range-Resolved Vibration Using Large Time-Bandwidth Product Waveforms, Halmos, et al., 28 pages.
U.S. Appl. No. 13/324,155, filed Jan. 13, 2011, entitled: Doppler Compensation For A Coherent Ladar, Coda, et al., 21 pages.
Response to Office Action in European Patent Application No. 12182615.0 filed on Jul. 17, 2013 12 pages.
Ling, H., "Exploitation of Microdoppler and Multiple Scattering Phenomena for Radar Target Recognition" Office of Naval Research, Research Grand N00014-03-1-0021 Oct. 1, 2002 through May 31, 2006 (Aug. 24, 2006).
Schneider, Richard; Peter Thurmel; Michael Stockman. "Distance measurement of moving objects by frequency modulated laser radar." Opt. Eng. 40(1), 33-37 (Jan. 7, 2001).
Extended European Search Report dated Dec. 28, 2012 for EP Application No. 12161856.5-1248 43 pages.
Office Action from Foreign Associate dated Aug. 13, 2013; for EP Application No. 12161856.5-1811 filed Jul. 27, 2013 4 pages.
Office Action from Foreign Associate dated Jul. 2, 2013; for EP Application No. 12159971.6-1811 filed Jun. 24, 2013 4 pages.
First Action Interview Office Action Summary dated Mar. 18, 2014 corresponding to U.S. Appl. No. 13/324,162, 19 pages.
Response to the Action dated Mar. 18, 2014 corresponding to U.S. Appl. No. 13/324,162, 16 pages.

(56) References Cited

OTHER PUBLICATIONS

Notice of Allowance dated Apr. 7, 2014 corresponding to U.S. Appl. No. 13/324,155, 7 pages.
Notice of Allowability dated Jun. 5, 2014 corresponding to U.S. Appl. No. 13/324,155, 4 pages.
Notice of Allowance dated Jul. 30, 2014 corresponding to U.S. Appl. No. 13/353,854, 7 pages.
First Action Interview Pilot Program Pre-Interview Communication dated Mar. 17, 2014 corresponding to U.S. Appl. No. 13/353,854, 7 pages.
Proposed Amendment in Response to the Action dated Mar. 17, 2014 corresponding to U.S. Appl. No. 13/353,854, 3 pages.
Response to the Office Action dated Dec. 6, 2013 corresponding to U.S. Appl. No. 13/285,821, 18 pages.

* cited by examiner

BISTATIC SYNTHETIC APERTURE LADAR SYSTEM

BACKGROUND

A laser detection and ranging (LADAR) sensor, sometimes referred to as a ladar, uses laser beams to measure distances (or ranges) and instantaneous velocities. A ladar can be used to form images of scenes with a high degree of definition (e.g., 15 cm or better resolution at ranges greater than 1,000 meters). A ladar may be mounted on stationary objects and on vehicles such as airplanes, for example.

SUMMARY

In one aspect, ladar system includes a ladar transmitter system and a ladar receiver system configured to receive data from the transmitter. The ladar transmitter system and the ladar receiver system are disposed in a configuration forming a bistatic synthetic aperture ladar system.

In another aspect, a ladar transmitter system includes a telescope, a laser and a communications module configured to communicate with a ladar receiver system to provide a frequency of the laser. The ladar transmitter system and the ladar receiver system are configured to be disposed in a configuration forming a bistatic synthetic aperture ladar system.

In a further aspect, a ladar receiver system includes a telescope, a local oscillator (LO) laser, a heterodyne detector configured to receive signals from the telescope and the LO laser, electronics configured to process a signal from the heterodyne detector to image a target and a communications module configured to communicate with a ladar transmitter system to synchronize the LO laser with a laser of the ladar transmitter system. The ladar transmitter system and the ladar receiver system are configured to be disposed in a configuration forming a bistatic synthetic aperture ladar system.

DETAILED DESCRIPTION

Described herein is a ladar that includes a ladar transmitter system (e.g., a ladar transmitter system 18 (FIG. 1)) and a ladar receiver system (a ladar receiver system 22 (FIG. 1)) that are separated from each other to form a bistatic ladar. When imaging a distant object, a large aperture receiver is required to collect enough signal to image the object. It is very difficult to fly and point a large aperture. As described herein, the large aperture receiver may be stationary instead, such as in a ground-based telescope, for example, and a laser transmitter can then be disposed on a moving platform such as a high-altitude aircraft or satellite, avoiding some of the turbulence from the atmosphere, and possibly reducing the power required by being closer to a target. The distance that the moving platform covers, represents a synthetic aperture formed to generate a high resolution image. For example, when imaging objects such as satellites in geo-orbit, a synthetic aperture of a few hundred meters would be required, but could be formed instead in a fraction of a second by a satellite or in one to two seconds by a fast moving airplane.

Even though there are bistatic radars, a radar system is vastly different from a bistatic ladar. For example, a bistatic ladar must overcome impediments that are not present in bistatic radar. In particular, for synthetic aperture imaging, the relative position of the ladar to the target must be known to a fraction of the operating wavelength, which is in microns rather than in tens of centimeters as is the case with radar. Also, the amount of frequency Doppler shift that needs to be handled with ladar is also orders of magnitude larger than with radar. In addition, radar is practically insensitive to atmospheric turbulence, where ladar is almost always impacted by it causing most designs to work around that impediment.

Figure 1:
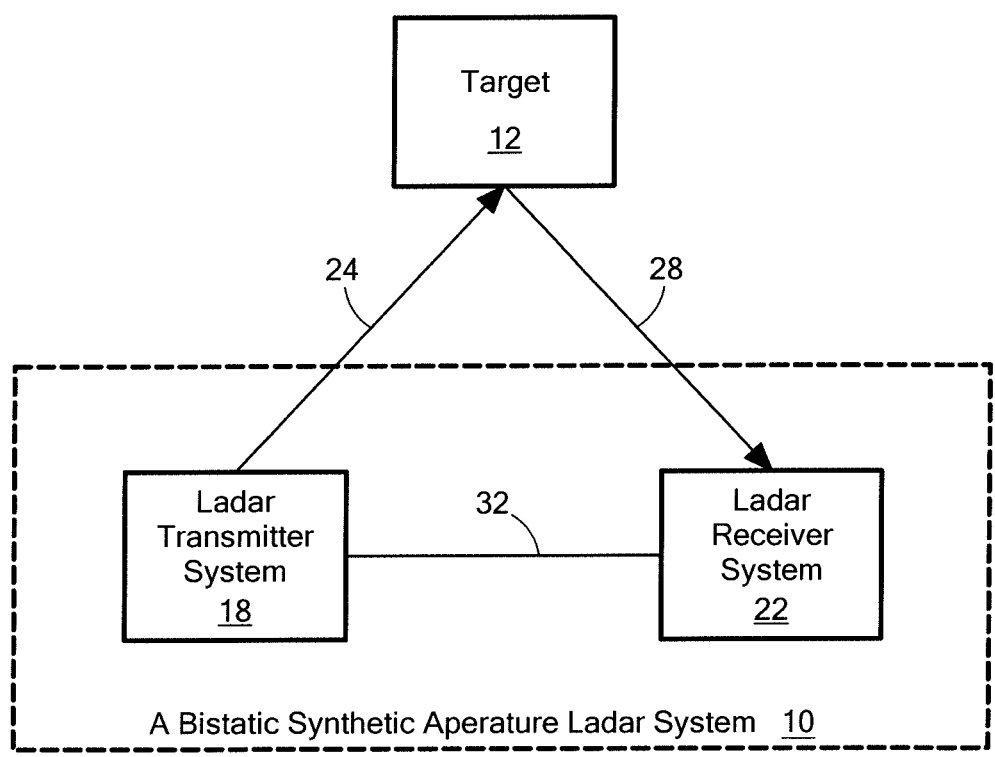
FIG. 1 is a functional block diagram of a bistatic ladar system with respect to a target.

Referring to FIG. 1, a bistatic synthetic aperture ladar system 10 includes a ladar transmitter system 18 and a ladar receiver system 22. The ladar transmitter system 18 illuminates a target 12 with a laser beam 24 and a laser beam 28 reflected from the target 12 is received by the ladar receiver system 22 which images the target.

The bistatic synthetic aperture ladar system 10 is a coherent ladar. For example, the ladar transmitter system 18 and the ladar receiver system 22 are in communications with each other through a communications link 32 in order to provide coherence between a frequency of a laser (e.g., a laser 202 (FIG. 2A)) at the ladar transmitter system 18 with a frequency of a local oscillator (LO) laser (e.g., a LO laser 248 (FIG. 2B)) at the ladar receiver system 22.

The bistatic synthetic aperture ladar system 10 is bistatic, for example, because the ladar transmitter system 18 and the ladar receiver system 22 are not disposed together. For example, the ladar transmitter system 18 may be disposed on a moving platform such as an aircraft, a satellite, a train, or a naval vessel while the ladar receiver system may disposed in a stationary structure such as a ground station up to a hundred kilometers away from the ladar transmitter system 18.

The bistatic synthetic aperture ladar system 10 is capable of forming a synthetic aperture when the laser transmitter system is disposed on a moving platform. A synthetic aperture is formed of a size equal to the distance the moving platform moves between two points in a time and is sometimes referred to as the synthetic aperture time.

Figure 2A:
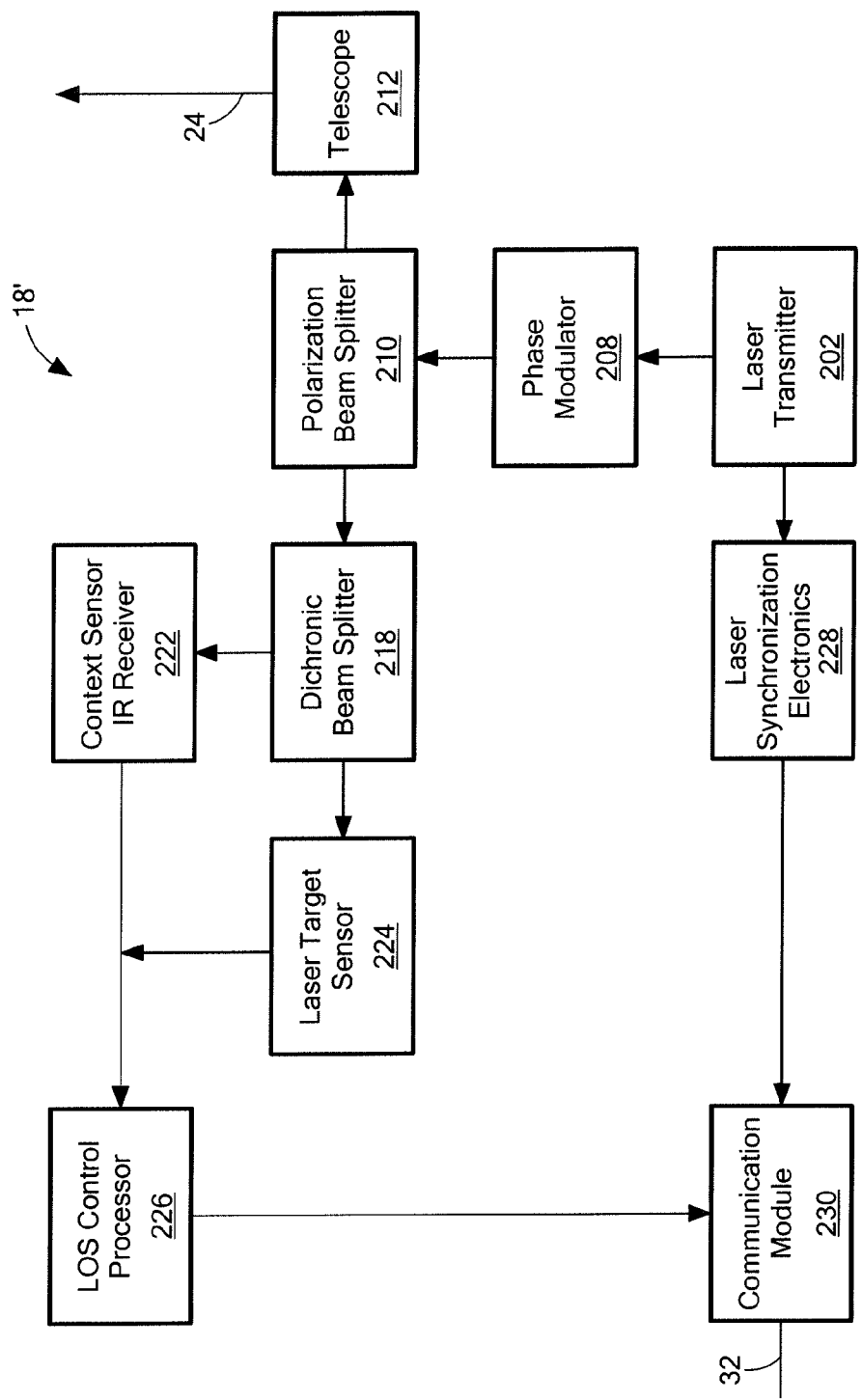
FIG. 2A is a functional block diagram of an example of a ladar transmitter system of the bistatic ladar system of FIG. 1.

Referring to FIG. 2A, an example of the ladar transmitter system 18 is a ladar transmitter system 18'. The ladar transmitter system 18' includes a laser transmitter 202, a phase modulator 208, a polarization beam splitter 210, a telescope 212, a dichroic beam splitter 218, a context sensor infrared (IR) receiver 222, a laser target sensor 224, line of site (LOS) control computers 226, laser synchronization electronics 228 and a communications module 230.

In operation, the laser transmitter 202 provides a laser beam to the phase modulator 208 which provides a high range resolution high coherence waveform, such as a Linear FM chirp waveform that is used for the synthetic aperture processing and image formation algorithms. The laser beam is reflected by a polarization beam splitter 210 to the telescope 212 to illuminate a remote target 12. The telescope 212 is also used to receive back possible target returns from solar illumination to help point the telescope 212 as well as laser returns to ensure that the laser beam is actually illuminating the target 12.

On the receiver path of the ladar transmitter system 18', 50% of the solar return is transmitter through polarizing beam splitter 210 and the laser return that is depolarized by the target 12 is also transmitted through beam splitter 210. Then the laser return and the solar return are separated by the dichroic beam splitter 218, where the solar return is directed to the context sensor IR receiver 222, and the laser return to the laser target sensor 224.

The context sensor IR receiver 222 and the laser target sensor 224 are coupled to the LOS control processor 226 to control the Line of Sight (LOS) of the ladar transmitter 18'. Typically, the field of illumination (FOI), of the laser transmitter 202 and the field of view (FOV) of the laser target sensor 224 are so narrow, that it would be hard to know if either is pointing in the right direction. The context IR Receiver 222 generally includes a larger FOV, ensuring that the target will fall within its FOV. One can pre-align the laser transmitter 202 to the center of the FOV of the context IR receiver 222, such that when the target is detected using the solar illumination, it can be brought to the center of the FOV of the laser transmitter 202, ensuring that it will hit the target.

In order for the bistatic scheme to work correctly, the laser transmitter 202 and the receiver reference LO (Local Oscillator) laser (e.g., a local oscillator laser 248 (FIG. 2A)) must be ultra-stable and synchronized to each other. Parameters of the laser transmitter laser 202 are extracted or provided to the laser synchronization electronics 228 and provided to the ladar receiver system 22' using the communications module 230.

In one example, the laser transmitter 202 is a Pound-Drever-Hall (PDH) ultra-stabilized laser in a master oscillator power laser amplifier (MOPA) configuration. In one example, the telescope 212 is a 20-inch diameter telescope. The absolute frequency difference between the laser transmitter 202 and LO laser is not very important in this case, but an atomic clock or other calibrated reference may be used to determine the lasers' absolute frequency. The relative phase history, modulation timing, approximate center frequency of the laser transmitter 202, and all motion data are transmitted from the ladar transmitter system 18' to the ladar receiver system 22' to set the receiver parameters to allow image reconstruction.

Figure 2B:
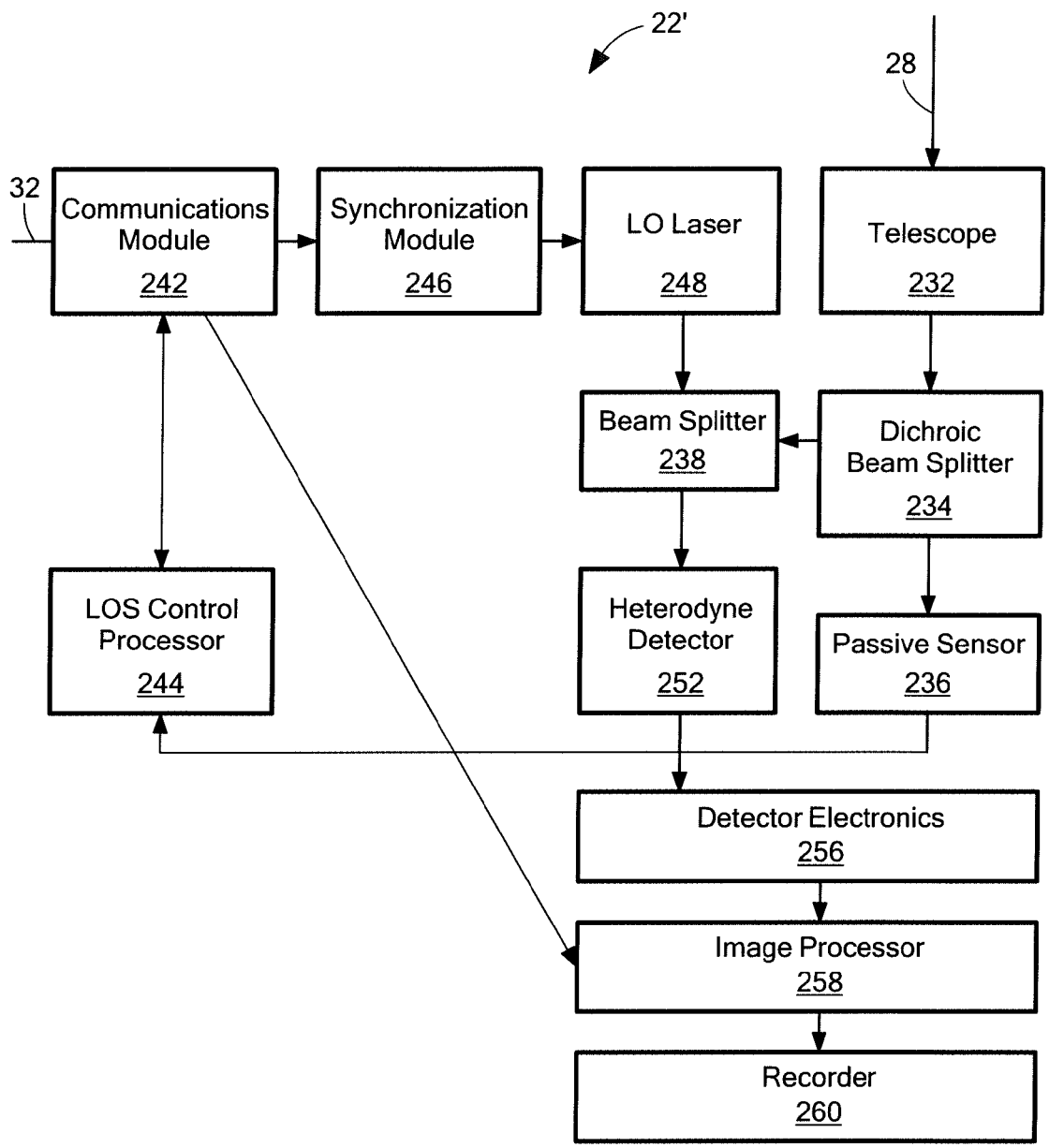
FIG. 2B is a functional block diagram of an example of a ladar receiver system of the bistatic ladar system of FIG. 1.

Referring to FIG. 2B, an example of the ladar receiver system 22' is a ladar receiver system 22'. The ladar receiver system 22' includes a large telescope 232, which may include a laser guide star, for example, to correct for turbulence effects. In one example, the telescope 232 includes an "Artificial Guide Star" correction system that includes a deformable mirror.

The ladar system 22' also includes a dichroic beam splitter 34, a passive sensor 236, a beam splitter 238 (e.g., a 95-5% beam splitter), a communications module 242, an LOS control processor 244, a synchronization module 246, a local oscillator (LO) laser 248, a heterodyne detector 252, detector electronics 256, an image processor 258 and a recorder 260.

In operation, the reflected laser beam 28 and any solar illumination off the target 12 is received by the telescope 232 (e.g., a telescope with a diameter greater than a meter) and is provided to the beam splitter 234. The solar signal provided to the beam splitter 234 is provided to the passive sensor 236 configured to provide context and line-of-site control. The other part of the signal, the laser beam, is reflected by the dichroic beam splitter 234 and is provided to the beam splitter 238.

In one example, the passive sensor 236 is the same as the context sensor IR 222. The passive sensor 236 ensures that the heterodyne detector 252 is pointing at the target 12. The passive sensor 236 provides sensor data to the LOS control processor 244 to control the LOS.

The data received from the ladar transmitter system 18' through the communications link 32 is provided to the synchronization module 246 which is configured to synchronize the local oscillator laser 248 with the laser 202 (FIG. 2A). The LO laser 248 is also an ultra-stable laser using, for example, the Pound-Trever-Hall technique to reduce the frequency jitter combined with a calibrated reference to know the absolute frequency. The output beam of the LO laser 248 is directed to the beam splitter 238 to mix with the laser return signal and both are provided to the heterodyne detector 252. The detector electronics 256 receives a resultant signal from the heterodyne detector 252 and detects the transmitter waveform. From the transmitter waveform and the information received by the ladar transmitter system 18', the image processor 258 determines an image of the target 12. All the raw and processed data will usually be recorded by the data recorder 258.

Figure 3:
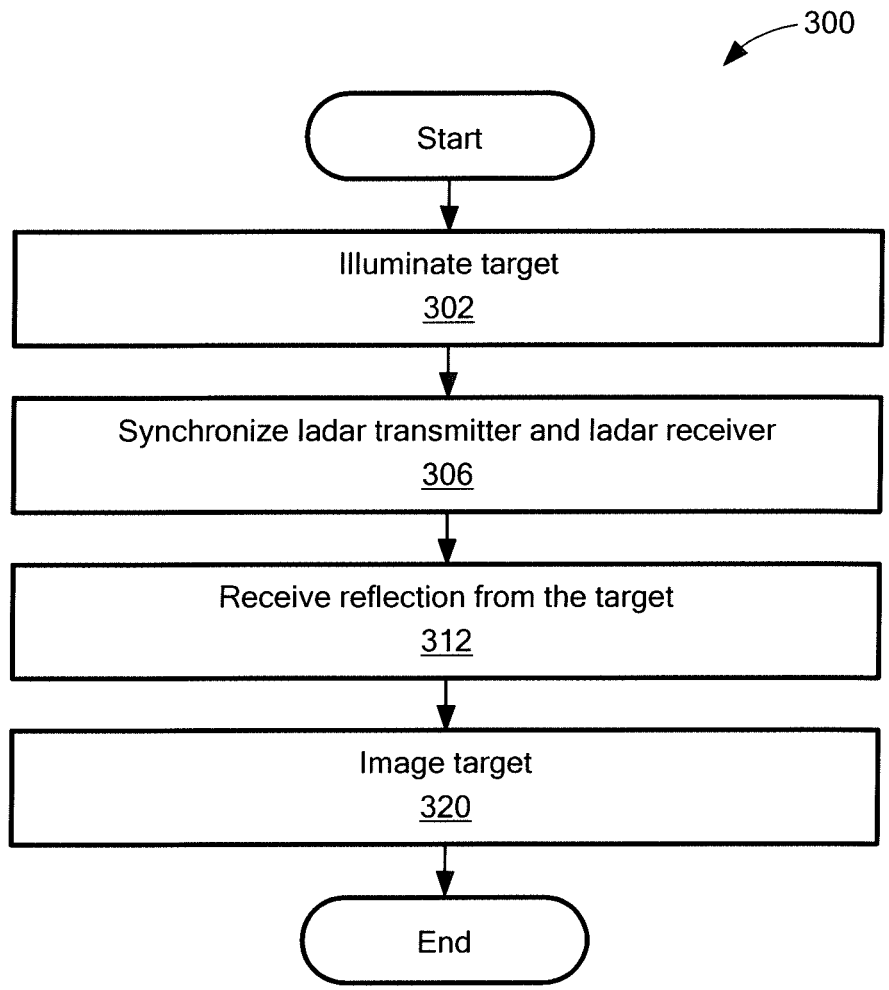
FIG. 3 is a flowchart of an example of a process to image the target using the bistatic ladar system of FIG. 1.

Referring to FIG. 3, an example of a process to image a target using the bistatic ladar system 10 is a process 300. Process 300 illuminates the target (302). For example, the ladar transmitter system 18 illuminates the target.

Process 300 synchronizes the ladar receiver system 22' with the ladar transmitter system 18' (306). For example, the frequency and phase history of the laser transmitter 202 waveform, as well as the motion data for compensation is sent from the communications module 230 of the ladar transmitter system 18' through the wireless communications link 32 to the communications module 242 of the ladar receiver 22' where it is provided to the synchronization module 246 to synchronize the LO laser 248. The LO laser 248 and the laser transmitter 202 may be synchronized to within 10 Hz even when the laser transmitter system 18∝0 and the laser receiver system 22∝0 are separated by a 100 km. Relativistic effects may be required to be taken into account in the synchronization procedure.

Process 300 receives a reflection from the target 12 (312) and images the target (320). For example, the detector electronics 256 process the signal from the heterodyne detector 252 based on the LO laser 248 mixed with the laser target return signal, and combined with the received ladar transmitter synchronization data to create a synthetic aperture image of the target 12.

Figure 4:
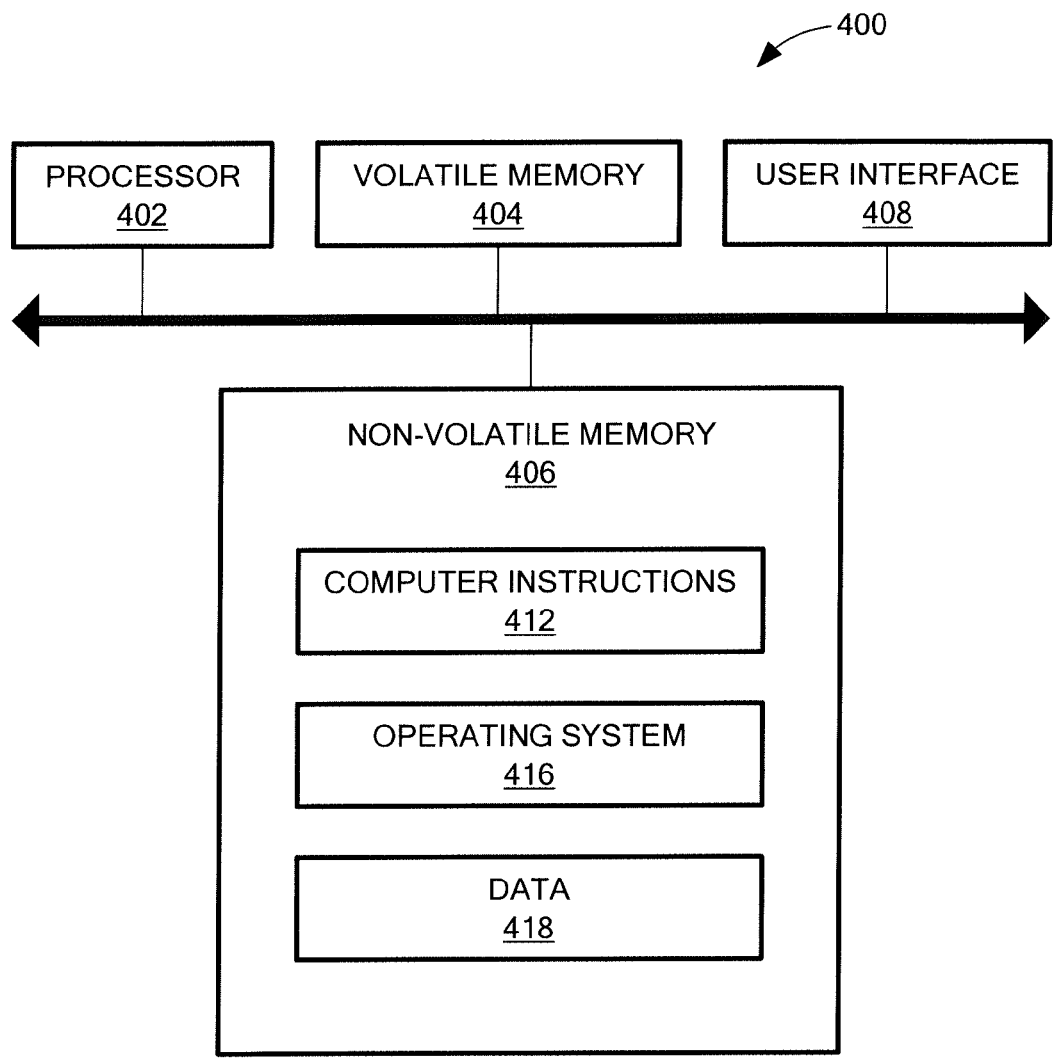
FIG. 4 is a computer on which the process of FIG. 3 may be implemented.

Referring to FIG. 4, in one example, a computer 400 includes a processor 402, a volatile memory 404, a non-volatile memory 406 (e.g., hard disk) and the user interface (UI) 408 (e.g., a graphical user interface, a mouse, a keyboard, a display, touch screen and so forth). The non-volatile memory 406 stores computer instructions 412, an operating system 416 and data 418. In one example, the computer instructions 412 are executed by the processor 402 out of volatile memory 404 to perform all or part of the processes described herein (e.g., process 300). In one example, the ladar transmitter 18 and the ladar receiver 22 each includes a computer 400 to perform all or part of the process 300.

The processes described herein (e.g., process 300) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 300 is not limited to the specific process order of FIG. 3, respectively. Rather, any of the processing blocks of FIG. 3 may be re-ordered, combined or removed, performed in parallel or in serial, as necessary, to achieve the results set forth above.

The processing blocks (for example, in the process 300) associated with implementing the system may be performed by one or more programmable processors executing one of more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:
1. A ladar system comprising;
a ladar transmitter system comprising:
 a first telescope;
 a first laser; and
 a first communications module configured to communicate a frequency of the first laser to a ladar receiver system; and
the ladar receiver system configured to receive data from the laser transmitter system, the ladar receiver system comprising;
 a second telescope;
 a second laser comprising a local oscillator (LO) laser;
 a heterodyne detector configured to receive signals from the second telescope and the second laser;
 electronics configured to process a signal from the heterodyne detector to image a target; and
 a second communications module configured to communicate with the first communications module of the ladar transmitter system to provide coherency between a frequency of the second laser with the frequency of the first laser of the ladar transmitter system,
wherein the ladar transmitter system and the ladar receiver system are disposed in a configuration forming a bistatic synthetic aperture ladar system,
wherein the ladar transmitter system further comprises ladar synchronization electronics configured to provied paramenters of the first laser to the ladar receiver system.

2. The ladar system of claim 1 wherein the ladar transmitter system is configured to be disposed in a vehicle.

3. The ladar system of claim 2 wherein the vehicle is one of a naval vessel, an air vehicle, satellite or a ground vehicle.

4. The ladar system of claim 1 wherein the ladar transmitter system is configured to be disposed in a vehicle and the ladar receiver system is configured to be stationary.

5. The ladar system of claim 1 wherein the ladar receiver system is configured to be stationary.

6. The ladar system of claim 5 wherein the second telescope comprises a ground-based telescope.

7. The ladar system of claim 6 wherein the diameter of the ground-based telescope is greater than one meter.

8. The War system of claim 1 wherein the ladar transmitter system and the ladar receiver system are separated by 100 kilometers.

9. The ladar system of claim 1 wherein the diameter of the first telescope is about 20 inches.

10. The ladar system of claim 1 wherein the first laser is a Pound-Drever-Hall (PDH) stabilized laser in a master oscillator power laser amplifier (MOPA) configuration.

11. The ladar system of claim 1 wherein the laser transmitter further comprises a context sensor infrared receiver.

12. The ladar system of claim 1 wherein the second telescope is a telescope that has a diameter greater than one meter.

13. The ladar system of claim 1, wherein the ladar receiver system further comprises:
 a dichroic beam splitter configured to provide:
  a reflected laser beam from a target to a beam splitter; and
  a solar signal from the target to a passive sensor configured to provide context and line-of-site control; and
 the beam splitter configured to mix the reflected laser beam and an output of the second laser to provide a mixed signal to the heterodyne detector.

14. A ladar receiver system comprising:
 a telescope;
 a local oscillator (LO) laser;
 a heterodyne detector configured to receive signals from the telescope and the LO laser;
 electronics configured to process a signal from the heterodyne detector to image a target;
 a dichroic beam splitter configured to provide:
  a reflected laser beam from the target to a beam splitter; and
  a solar signal from the target to a passive sensor configured to provide context and line-of-site control;
 the beam splitter configured to mix the reflected laser beam and an output of the LO laser to provide a mixed signal to the heterodyne detector; and
 a communications module configured to communicate with a communications module of a ladar transmitter system to provide coherency between a frequency of the LO laser with a frequency of a first laser of the ladar transmitter system, wherein the lady transmitter system and the ladar receiver system are configured to be disposed in a configuration forming a bistatic synthetic aperture ladar system.

15. The ladar receiver system of claim 14 wherein the telescope is a telescope that has a diameter greater than one meter.

* * * * *